United States Patent [19]

Tschang et al.

[11] Patent Number: 4,647,637

[45] Date of Patent: Mar. 3, 1987

[54] PREPARATION OF INSOLUBLE POLYMER POWDERS WHICH ARE ONLY SLIGHTLY SWELLABLE

[75] Inventors: Chung-Ji Tschang, Bad Durkheim; Karlheinz Messmer, Weisenheim; Walter Denzinger, Speyer, all of Fed. Rep. of Germany

[73] Assignee: BASF Aktiengesellschaft, Ludwigshafen, Fed. Rep. of Germany

[21] Appl. No.: 777,327

[22] Filed: Sep. 18, 1985

[30] Foreign Application Priority Data

Sep. 18, 1984 [DE] Fed. Rep. of Germany ......... 3,434,137

[51] Int. Cl.$^4$ .............................................. C08F 2/34
[52] U.S. Cl. ..................................... 526/264; 526/71
[58] Field of Search ................ 526/264, 88, 201, 203, 526/306, 323.1, 323.2, 318.43; 521/38

[56] References Cited

U.S. PATENT DOCUMENTS

| | | | |
|---|---|---|---|
| 3,689,439 | 9/1972 | Field | 526/264 |
| 3,933,766 | 1/1976 | Hofmann | 526/264 |
| 4,013,825 | 5/1977 | Denzinger et al. | |
| 4,059,552 | 11/1977 | Zweigle | 526/306 |
| 4,135,043 | 1/1979 | Kast et al. | |
| 4,361,689 | 11/1982 | Patel | 526/264 |
| 4,451,582 | 5/1984 | Denzinger | 526/284 |

FOREIGN PATENT DOCUMENTS 0027936 10/1983 European Pat. Off. .

*Primary Examiner*—Paul R. Michl
*Attorney, Agent, or Firm*—Oblon, Fisher, Spivak, McClelland & Maier

[57] ABSTRACT

Insoluble polymer powders which are only slightly swellable and are based on N-vinylpyrrolidone are prepared by polymerization of N-vinylpyrrolidone or a mixture of this with copolymerizable monomers and from 0.1 to 10% by weight, based on the total amount of monomers, of a crosslinking agent in a powder bed in the presence of a heat-transfer medium, which is inert to the reactants, and in the absence of oxygen and polymerization initiators, at from 90° to 220° C., while maintaining the powder state, circulating the reaction mass and evaporating the heat-transfer medium from the polymerization zone. The resulting insoluble polymers which are only slightly swellable are used as adsorbents or formulation assistants for fertilizers and crop protection agents.

14 Claims, No Drawings

PREPARATION OF INSOLUBLE POLYMER POWDERS WHICH ARE ONLY SLIGHTLY SWELLABLE

German Patent No. 2,255,263 discloses a process for the preparation of insoluble crosslinked N-vinylpyrrolidone polymers which are only slightly swellable, in which N-vinylpyrrolidone is polymerized in aqueous solution in the presence of, as a crosslinking agent, from 0.5 to 10% by weight, based on the N-vinylpyrrolidone, of a cyclic acid amide which contains two or more ethylenically unsaturated groups, not less than one of which is bonded to the amide nitrogen. The polymerization reaction is initiated by heating the reaction solution to not less than 80° C., and is completed at the boiling point of water.

U.S. Pat. No. 3,277,066 relates to a process for the preparation of insoluble polymers of N-vinyllactams by heating N-vinyllactams in the presence of oxides and hydroxides of alkali metals or alkaline earth metals as catalysts, and of water. The polymerization is initiated at elevated temperatures, e.g. 140° C., and then continued at a lower temperature (100°.C.).

According to German Patent No. 2,437,640, N-vinylpyrrolidone is polymerized in dilute aqueous solution in the presence of the same crosslinking agent in the absence of oxygen and additionally in the presence of from 0.05 to 2% by weight, based on N-vinylpyrrolidone, of one or more α- or β-ketocarboxylic acids or their methyl or ethyl esters. In the conventional process, it is necessary for at least a small amount of a base to be used concomitantly. However, care must be taken to ensure that polymerization is not effected at too high a pH, since otherwise yellowing of the polymers occurs.

U.S. Pat. No. 4,451,582 discloses a process for the preparation of insoluble, particulate polymers which are only slightly swellable in water and are obtained from basic vinyl heterocycles having a pKa higher than 4, and their copolymers with as much as 30% by weight of copolymerizable monomers, wherein the monomers are polymerized in the presence of from 0.1 to 10% by weight, based on the total amount of monomers, of a crosslinking agent, in the absence of oxygen and polymerization initiators. The polymers are preferably prepared by precipitation polymerization in water. However, they may also be obtained in the absence of solvents for the monomers, by heating the latter to, preferably, 150°-180° C. The reaction is of course difficult to control and gives only low spacetime yields and relatively highly contaminated products.

German Laid-Open Application DOS No. 2,636,243 relates to a process for the preparation of polymer powders, wherein water-soluble ethylenically unsaturated compounds which form hydrophilic polymers are polymerized in the presence of a polymerization initiator and in the presence of water as a heat-transfer medium in a powder bed to give water-soluble or water-swellable polymers, the powder state being maintained, the reaction mass being circulated and the water from the polymerization zone being evaporated.

European patent application No. 27,936 discloses a process for the preparation of polymer powders of polymerizable monoethylenically unsaturated compounds, wherein the monomers are polymerized in a powder bed in the presence of a conventional polymerization initiator, the powder state being maintained and the reaction mass being circulated. The heat of polymerization is removed using as a heat-transfer medium, an organic solvent which constitutes a precipitating agent for the polymers. The organic solvents are removed from the polymerization zone in the form of vapor. Water-soluble or water-swellable polymers are obtained.

It is an object of the present invention to provide a process for the preparation of insoluble N-vinylpyrrolidone polymer powders which are only slightly swellable, in which a very pure polymer powder is obtained directly, and the space-time yield is higher than in the conventional processes for the preparation of insoluble polymers.

We have found that this object is achieved, in accordance with the invention, if (a) N-vinylpyrrolidone or a mixture of not less than 0.5% by weight of N-vinylpyrrolidone with acrylamide, methacrylamide, acrylates, methacrylates, acyclic N-vinylcarboxamides, a vinyl ester and/or a compound of the formula

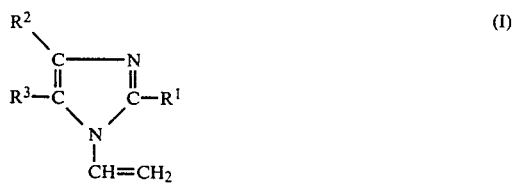

where $R^1$, $R^2$ and $R^3$ are each H or $CH_3$ and $R^1$ may furthermore be $C_2H_5$, $C_3H_7$ or $C_4H_9$, and (b) from 0.1 to 10% by weight, based on the total amount of monomers, of, as a crosslinking agent, a compound which possesses two or more ethylenically unsaturated double bonds are polymerized in the absence of oxygen and a polymerization initiator in a powder bed which contains or consists of an insoluble polymer which is only slightly swellable, in the presence of a heat-transfer medium which is inert to the reactants, at from 90° to 220° C., the powder state being maintained, the reaction mass being circulated and the heat-transfer medium being evaporated from the polymerization zone.

In contrast to the conventional preparation of insoluble polymer powders which are only slightly swellable, i.e. the popcorn polymers, the preparation of these polymers according to the present invention is carried out in a powder bed. The powder state of the reaction mixture is maintained during the entire polymerization. The induction period which is otherwise usual may be dispensed with in the novel process if any insoluble polymer which is only slightly swellable (popcorn polymer) is initially taken in the polymerization zone, this polymer having been prepared, and where relevant stored and handled, in the absence of oxygen. Such popcorn polymers possess a sufficient number of active centers to initiate polymerization of the monomers when suitable monomer mixtures are fed in. Popcorn polymers which have come into contact with oxygen can also be used for initiating the popcorn polymerization after the oxygen has been completely removed.

N-Vinylpyrrolidone is preferably used as monomer component (a). Mixtures which contain not less than 0.5% by weight of N-vinylpyrrolidone and, as further monomers, acrylamide, methacrylamide, acrylates, methacrylates, acyclic N-vinylcarboxamides and/or vinyl esters are also suitable. Particularly suitable acrylates and methacrylates are those which are derived from monohydric $C_1-C_4$-alcohols or from saturated dihydric $C_2-C_4$-alcohols. Examples of suitable acyclic N-vinylcarboxamides are compounds of the formula $$R-CO-NR^1-CH=CH_2 \quad \text{II}$$

where R is H or $C_1-C_3$-alkyl and $R^1$ is H or $CH_3$. Typical examples of this class of compounds are N-vinylformamide, N-vinyl-N-methylformamide and N-vinyl-N-methylacetamide. Particularly suitable compounds of the formula I are 1-vinylimidazole and the methyl-substituted derivatives, such as 1-vinyl-2-methylimidazole. Other particularly important monomers (a) are mixtures of from 99 to 30% oy weight of N-vinylpyrrolidone and from 1 to 70% by weight of vinyl propionate. Monomer mixtures which are suitable as component (a) contain from 99 to 0.5% by weight of N-vinylpyrrolidone and from 1 to 99.5% by weight of one or more monomers or a monomer mixture of acrylamide, methacrylamide, N-vinylformamide, N-vinyl-N-methylacetamide and/or an acrylate.

The crosslinking agent used as the monomer of component (b) is a compound which possesses two or more ethylenically unsaturated double bonds which are not conjugated. Preferred crosslinking agents are divinylethyleneurea, ethylidene bis-3-(N-vinylpyrrolidone), 1-vinyl-3-ethylidenepyrrolidone, allyl acrylate, allyl methacrylate, divinylpropyleneurea, butanediol diacrylate, methylene-N,N'-bisacrylamide and ethylene-N,N'-disacrylamide. The crosslinking agents are present in an amount of from 0.1 to 10, preferably from 0.4 to 2, % by weight, based on the total amount of monomers used in the polymerization. It is possible to use either a single crosslinking agent, e.g. divinylethyleneurea or allyl acrylate, or a mixture of a plurality of crosslinking agents, e.g. a mixture of divinylethyleneurea and butanediol diacrylate or of divinylpropyleneurea and methylene-N,N'-bisacrylamide.

The popcorn polymers which are initially taken to initiate the popcorn polymerization can be prepared by the conventional processes, some of which, as prior art processes, are described above. Preferably, known popcorn polymers of N-vinylpyrrolidone and a crosslinking agent are used as the starting material for initiating the polymerization in the novel process. The preparation of the starting material can be carried out in a separate apparatus or in the apparatus in which the polymerization is subsequently carried out in the powder bed. A polymerizable popcorn polymer which initiates the polymerization on addition of a suitable monomer mixture can be prepared starting from, for example, a mixture of from 99.6 to 98.8% by weight of N-vinylpyrrolid-2-one and, as a crosslinking agent, from 0.4 to 1.2% by weight of a compound possessing two or more ethylenically unsaturated double bonds. Freshly distilled N-vinylpyrrolid-2-one is preferably used for this purpose, since N-vinylpyrrolidone which has been stored for a fairly long time gives rise to longer induction periods. The polymerization can be initiated and continued with either water-containing or anhydrous N-vinylpyrrolidone. However, it is advantageous to use anhydrous N-vinylpyrrolidone to initiate the polymerization, since the latter is as a rule initiated at above the boiling point of water. In general, such popcorn polymers are prepared at from 100° to 150° C. in the absence of oxygen and polymerization initiators.

Preferably used crosslinking agents for the preparation of an active popcorn polymer are divinylethyleneurea, ethylidene-bis-3-(N-vinylpyrrolidone), 1-vinyl-3-ethylidenepyrrolidone, butanediol diacrylate, methylene-N,N'-bisacrylamide, ethylene-N,N'-bisacrylamide and/or divinylpropyleneurea. In the preferred embodiment, the amount of crosslinking agent used for the preparation of the active popcorn is less than that used hitherto for the preparation of popcorn polymers of N-vinylpyrrolidone. However, it is also possible to use larger amounts of crosslinking agent for the said preparation, although in this case a longer induction period and polymerization period must be expected. The induction period in the preparation of the active popcorn polymer is about 10-30 minutes. The monomer mixtures described above are polymerized while stirring. When the polymerization is complete, a dry powder forms from the solution and may be stored in the absence of oxygen or used directly as the initially taken material in the polymerization in the powder bed.

It is also possible to use inert, powdered materials as the starting material for the polymerization in the powder bed. Examples of such substances are sand, glass beads, titanium dioxide and polymer powders whose melting point or softening range is above the polymerization temperature. An example of a suitable polymer powder is a bead polymer of styrene which is crosslinked with divinylbenzene or with another compound containing two ethylenically unsaturated double bonds. Polymerization in the powder bed can be initiated by a procedure in which either a preprepared active popcorn polymer is added to this inert powdered material, or a mixture of from 99.6 to 98.8% by weight of N-vinylpyrrolidone and from 0.4 to 1.2% by weight of a compound possessing two or more ethylenically unsaturated double bonds is heated, initially with thorough mixing with the inert powdered material, to 100°-150° C. in the absence of oxygen and polymerization initiators. This procedure gives a polymerizable popcorn polymer which initiates the polymerization of the monomers without an induction period when suitable monomer mixtures are added.

The polymerization in the powder bed may also be initiated starting from an insoluble polymer powder which is only slightly swellable and which is obtained, for example, by heating N-vinylformamide or a monomer mixture of acrylamide and N-vinylpyrrolidone, containing from 0.2 to 2% by weight of a compound possessing two or more ethylenically unsaturated double bonds, in the presence of an inert powdered material, to 100°-150° C. These popcorn polymers may be prepared in the presence or absence of an inert powdered material.

The popcorn polymers described above are insoluble in all solvents and furthermore only slightly swellable in them. Although they can absorb as much as 10 times their weight of water, they nevertheless differ from polymers regarded as swellable in that their water-absorption capacity for a given content of crosslinking agent is only a fraction of the water-absorption capacity of the conventional gel-like polymers prepared in the presence of a polymerization initiator. The particle diameter of the insoluble polymers which are only slightly swellable is from 0.05 to 5 mm. For the novel preparation of popcorn polymers, an insoluble polymer which is only slightly swellable is initially taken in a polymerization zone or is prepared in this zone, and the monomer mixturees of (a) and (b) described above are then polymerized in the presence of a heat-transfer medium which is inert to the reactant and in the absence of oxygen and polymerization initiators, at from 90° to 220° C., the powder state being maintained, the reaction mass circulated and the heat-transfer medium evaporated from the polymerization zone. The purpose of the heat-transfer media is to remove from the reaction system the heat formed during the polymerization and as a result of circulating the powder.

Examples of suitable heat-transfer media are the following substances which are liquid at room temperature: water, alcohols, ketones, ethers, aromatic and aliphatic hydrocarbons, halohydrocarbons and esters. The heat-transfer medium is advantageously used in an amount sufficient to remove from the polymerization zone the heat formed under the reaction conditions. The amount of heat-transfer medium is therefore dependent on the heat of evaporation of the particular heat-transfer medium used, i.e. the amount of heat liberated during the polymerization must be about as large as the enthalpy of evaporation of the heat-transfer medium. For example, where water is used as the heat-transfer medium, it is required in an amount of about 5–25%, based on the monomers used in the polymerization, whereas where organic solvents are used as heat-transfer media, about 15–70%, based on the monomers, of solvent is required. Solid monomers, e.g. acrylamide, must be brought into solution before the novel polymerization is carried out. In this respect, it may be necessary to use a larger amount of solvent, e.g. water, than can be evaporated by means of the enthalpy of polymerization. In these cases, it is appropriate to evaporate the excess solvent by supplying heat to the polymerization space. Specific examples of heat-transfer media are methanol, ethanol, isopropanol, n-propanol, n-butanol, isobutanol, tert.-butanol, cyclohexanol, acetone, methyl ethyl ketone, diethyl ketone, cyclohexanone, methyl tert.-butyl ether, pentane, hexane, cyclohexane, aliphatic $C_7$–$C_{10}$-hydrocarbons, toluene, xylene, propyl acetate and butyl acetate.

Preferably used heat-transfer media are water, monohydric $C_1$–$C_4$-alcohols, methyl ethyl ketone, cyclohexanone, n-propanol, isopropanol and propyl acetate. The heat-transfer media are liquid under atmospheric pressure and have a boiling point of about 40°–150° C.

The heat-transfer medium, together with the monomer mixture, is brought into contact with the powdered polymer, which has been heated to the polymerization temperature. The monomers (a) and (b) are introduced continuously or batchwise into the powder bed, preferably at the rate at which they undergo polymerization. Particularly preferably the monomers are introduced continuously or batchwise into the powder bed, and the resulting polymer is discharged continuously or batchwise from the polymerization zone in an amount roughly corresponding to the weight of monomers fed in.

The polymerization of the monomers (a) and (b) is carried out in, for example, kettles equipped with mixing elements, autoclaves, which may be arranged as a multi-stage cascade, or combinations of kettles with downstream flow tubes. A solution of the monomers (a) and (b), preferably in the particular heat-transfer medium used, is sprayed onto the powder bed and onto the powdered material initially taken in the polymerization apparatus, under polymerization conditions. However, the heat-transfer medium may also be introduced into the polymerization zone separately from the monomers. During the polymerization, thorough mixing of the powder bed is ensured. Since the heat-transfer medium is removed from the polymerization zone, the powder state of the reaction mass is maintained during the entire course of the polymerization. If only small amounts of a popcorn polymer are desired, the reaction is terminated as soon as the desired amount has been prepared, or when the polymerization apparatus is filled with polymer. However, the polymerization may also be carried out continuously over several days or even weeks if monomers are introduced continuously or batchwise in each case at the rate at which polymer is discharged from the polymerization zone. Insoluble polymer powders based on N-vinylpyrrolidone which are only slightly swellable are obtained directly. The composition of the monomers can be changed continuously or abruptly without stopping the polymerization. For example, N-vinylpyrrolidone, as component (a), can be polymerized with a monomer of component (b), and the composition of the feed can be changed suddenly by introducing a mixture of only 0.5% by weight of N-vinylpyrrolidone and 99.5% by weight of acrylamide into the polymerization zone, as component (a). When a steady state has been reached in the reactor, a polymer is obtained whose composition corresponds to that of the monomer mixture. The particle diameter of the popcorn polymers is about 0.05–5 mm.

The popcorn polymers obtained according to the invention are used as adsorbents, for example for adsorbing tannin from beverages, and as formulation assistants for fertilizers and crop protection agents. For the last-mentioned fields of use, the popcorn polymers are mixed with the active ingredients and result in better distribution of the fertilizers or crop protection agents when used in a manner specified.

EXAMPLES

Example 1 to 6

In all Examples, the polymerization apparatus used was a 1 l flask provided with a magnetic stirrer, an anchor stirrer, a dropping funnel suitable for working under a nitrogen atmosphere, a reflux condenser and a nitrogen feed tube. The flask was immersed in a heatable oil bath, and about 10 l/hour of nitrogen were passed through the apparatus. To carry out the polymerization, 15 g of N-vinylpyrrolidone and 0.12 g of divinylethyleneurea were initially taken in the above apparatus for the preparation of an active popcorn polymer and were polymerized. To do this, the contents of the flask were heated to 110° C. while stirring constantly. At this temperature, a white, loose polymer began to form. Polymerization started after abut 15 minutes and was complete within about 5 minutes from the start.

This polymer was the material initially taken for the polymerization in the powder bed, for which the reflux condenser was then replaced by a distillation condenser with a receiver, and the mixture of the monomers (a) and (b) and the heat-transfer medium was added in such a way that the powder state was maintained during the polymerization, and the heat-transfer medium distilled off from the polymerization zone. Polymerization was carried out at 110° C. Table 1 shows the starting materials for the polymerization in the powder bed and the particular yields obtained after washing the popcorn polymer twice with acetone. The particle size of the popcorn polymers was about 0.05–5 mm.

The tannin adsorption of some of the polymers described above was tested. To carry out the test, 100 ml of a 0.01% strength by weight aqueous tannin solution were added to 100 mg of the polymer, and the mixture was shaken for 10 minutes and for 40 minutes. After the stated times, the polymer was filtered off, the filtrate diluted with water to one-fifth of the initial concentration, and the residual content of tannin measured by comparison with an untreated solution at a wavelength of 275 nm in a spectrophotometer. The results of these tests are likewise shown in the table.

TABLE

| Example | Feed | | Yield | Residual tannin [%] | |
| | Monomers | Heat-transfer medium | [g] | 10 min | 40 min |
| --- | --- | --- | --- | --- | --- |
| 1 | 150 g VP[1]; 0.75 g DVEU[2] | 50 ml water | 154 | 47 | 28 |
| 2 | 100 g VP; 0.5 g DVEU | 15 ml n-propanol | 86 | 50 | 22 |
| 3 | 100 g VP; 0.5 g DVEU | 15 ml methylcyclohexane | 82 | — | — |
| 4 | 100 g VP; 0.5 g DVEU | 15 ml n-heptanol | 83 | — | — |
| 5 | 100 g VP; 0.5 g DVEU | 15 ml propyl acetate | 88 | 52 | 23 |
| 6 | 100 g VP; 0.5 g DVEU | 15 ml 3-methylpentan-2-one | 72 | — | — |

[1] VP = N—vinylpyrrolid-2-one
[2] DVEU = divinylethyleneurea (N,N'—divinylimidazolid-2-one)

Example 7

The apparatus described in Examples 1 to 6 was used, and the popcorn polymer likewise described there and serving as the initially taken material for the polymerization in the powder bed was first prepared in this apparatus. A solution of 105 g of N-vinylpyrrolidone, 45 g of vinyl propionate and 3.9 g of divinylethyleneurea in 25 ml of n-propanol was added continuously to the said polymer at 110° C. in the course of 80 minutes, and the n-propanol used as the heat-transfer medium was distilled off continuously from the reaction zone, the powder state in the polymerization apparatus being maintained. The polymer was then washed with methanol and then with water, and dried at 70° C. under reduced pressure. A total of 154 g of a popcorn polymer having a particle size of 0.1 to 3 mm was obtained.

Example 8

2 g of the popcorn polymer obtained as described in Example 1 and consisting of 99.2% by weight of N-vinylpyrrolidone and 0.8% by weight of divinylethyleneurea were initially taken under a nitrogen atmosphere in a 1 l flask which was equipped with an anchor stirrer, a dropping funnel for working under a nitrogen atmosphere, a distillation condenser with a receiver and a nitrogen feed tube, and the polymer was heated to 120° C. under a nitrogen atmosphere. The polymerization in the powder bed was then carried out without any detectable induction period by continuously adding a mixture of 100 g of N-vinyl pyrrolidone, 0.8 g of divinylethylene urea and 20 ml of n-propanol to the initially taken material in the course of 60 minutes. Polymerization was effected at 120° C. while maintaining the powder state, circulating the reaction mass and evaporating the N-propanol from the polymerization zone. The yield of popcorn polymer was 98% of theory.

Example 9

Example 8 was repeated, except that a mixture of 90 g of acrylamide, 10 g of N-vinylpyrrolidone, 1.5 ml of 30% strength aqueous formaldehyde and 40 ml of water was used as the feed for the polymerization in the powder bed. Under the reaction conditions, formaldehyde and acrylamide give the crosslinking agent methylene-N,N'-bisacrylamide. The yield was 95% of theory.

Example 10

5 g of a macroporous bead polymer consisting of 50% by weight of styrene and 50% by weight of technical-grade divinylbenzene, having a pore volume of about 1.5 m³/g and a particle size of from 315 to 500 μm, were initially taken in the apparatus described in Examples 1 to 6, and were heated to 110° C. while gassing with nitrogen. A solution of 100 g of N-vinylpyrrolidone, 1 g of divinylethyleneurea and 20 ml of water was then added continuously while maintaining the temperature. Polymerization began within a few minutes. Water was distilled off continuously while maintaining the powder state. The polymer was washed with methanol and then with water, and dried at 70° C. under reduced pressure. The yield was 89% of theory.

5 g of a macroporous perlpolymer of 50% by weight of styrene and 50% by weight of divinylbenzene were placed in an apparatus similar to that described in Examples 1 to 6 and heated therein at 110° C. At this temperature fresh popcorn polymer was prepared by adding a mixture of from 15 g of N-vinylpyrrolidone and 0.12 g of divinylethyleneurea. Thereafter, the temperature of the oil bath was set and a mixture of the monomers (a) and (b) and the heat-transfer medium was added continuously in the course of 80 minutes, the relevant data being shown in the Table below. The heat transfer medium was distilled off continuously while maintaining the powder state. The resulting popcorn polymer was washed twice with acetone and then dried at 70° C. under reduced pressure. The yield is likewise shown in the Table.

TABLE

| Example No. | Feed | | | Temperature [°C.] | Yield [% of theory] |
| | Monomer (a) | Monomer (b) | Heat-transfer medium | | |
| --- | --- | --- | --- | --- | --- |
| 11 | 50 g of N—vinylpyrrolidone<br>50 g of methyl methacrylate | 1.5 g of divinylethyleneurea | 30 ml of 4-methylpentan-2-one | 140 | 88 |
| 12 | 60 g of methyl acrylate<br>40 g of N—vinylpyrrolidone | 2 g of butane-1,4-diol diacrylate | 25 ml of ethyl acetate | 110 | 89 |
| 13 | 60 g of N—vinyl- | 1.2 g of divinylethylene- | 40 ml of n-propanol | 130 | 86 |

| Example | Feed | | | Temperature | Yield |
|---|---|---|---|---|---|
| No. | Monomer (a) | Monomer (b) | Heat-transfer medium | [°C.] | [% of theory] |
| | pyrrolidone 40 g of hydroxyethyl acrylate | urea | | | |

Comparative Example 1

An aqueous solution of 150 g of acrylamide, 0.3 g of methylene-N,N'-bisacrylamide and 0.5 g of potassium peroxodisulfate in 500 ml of water was initially taken in a 1 l flask equipped with a stirrer, a reflux condenser and an apparatus for working under nitrogen, and the solution was heated at 70° C. for 4 hours. After 40 minutes, the stirrer had to be switched off because the contents of the flask had solidified.

Comparative Example 2

A solution of 150 g of acrylamide, 2 g of divinylethyleneurea and 0.5 g of potassium peroxodisulfate in 500 ml of water was subjected to the polymerization at 70° C. in the apparatus described in Comparative Example 1. After a polymerization time of 40 minutes, it was no longer possible to stir the contents of the flask. A colorless gel was obtained. This was comminuted, then washed with water and several times with acetone and finally dried at 70° C. under reduced pressure. 144 g of a polymer having a bulk density of 0.73 g/cm³ were obtained.

We claim:

1. A process for the preparation of an insoluble polymer powder which is only slightly swellable and which contains N-vinylpyrrolidone units, comprising:
copolymerizing (a) N-vinylpyrrolidone or a mixture of not less than 0.5% by weight of N-vinylpyrrolidone with acrylamide, methacrylamide, acrylates, methacrylates, acyclic N-vinylcarboxamides, a vinyl ester and/or a compound of the formula:

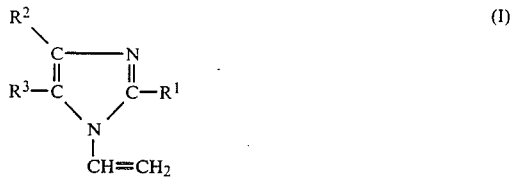

wherein $R^1$, $R^2$ and $R^3$ are each H or $CH_3$ and $R^1$ may furthermore be $C_2H_5$, $C_3H_7$ or $C_4H_9$, and (b) from 0.1 to 10% by weight, based on the total amount of monomers, of, as a crosslinking agent, a compound which possesses at least two ethylenically unsaturated double bonds in the absence of both oxygen and a polymerization initiator in a powder bed which contains or consists of an insoluble polymer which is only slightly swellable, in the presence of a heat-transfer medium which is inert to the reactants, at from 90° to 220° C., the powdered state of the bed being maintained, and the reaction mass being circulated and the heat-transfer medium being evaporated from the polymerization zone.

2. The process as claimed in claim 1, wherein the monomers (a) and (b) are introduced continuously or batchwise into the powder bed.

3. The process as claimed in claim 1, wherein polymer powder is discharged continuously or batchwise from the polymerization zone in an amount corresponding to the weight of monomers fed in.

4. The process as claimed in claim 1, wherein, in order to initiate the polymerization, said powdered bed is an insoluble polymer which is only slightly soluble and has been prepared in a conventional manner and handled in the absence of oxygen.

5. The process as claimed in claim 1, wherein, in order to initiate the polymerization, an insoluble N-vinylpyrrolidone polymer powder which is only slightly swellable is first prepared by heating a mixture of from 99.6 to 98.8% by weight of N-vinylpyrrolidone and from 0.4 to 1.2% by weight of a compound possessing at least two ethylenically unsaturated double bonds to 100°–150° C. in the absence of oxygen and polymerization initiators.

6. The process as claimed in claim 1, wherein, in order to initiate the polymerization, an inert powdered material is initially placed in the polymerization zone, after which an insoluble N-vinylpyrrolidone polymer which is only slightly swellable is prepared by heating a thoroughly mixed mixture of from 99.6 to 98.8% by weight of N-vinylpyrrolidone and from 0.4 to 1.2% by weight of a compound possessing at least two ethylenically unsaturated double bonds, to 100°–150° C. in the absence of oxygen and polymerization initiators.

7. The process as claimed in claim 1, wherein, in order to initiate the polymerization, an insoluble polymer powder which is only slightly swellable, is first prepared by heating N-vinylformamide or a monomer mixture of acrylamide and N-vinylpyrrolidone, which contains from 0.4 to 2% by weight of a compound possessing at least two ethylenically unsaturated double bonds, to 100°–150° C. in the presence or absence of an inert powdered material.

8. The process as claimed in claim 1, wherein said monomer (a) is N-vinylpyrrolidone.

9. The process as claimed in claim 1, wherein said monomer (a) is a mixture of from 99 to 30% by weight of N-vinylpyrrolidone and from 1 to 70% by weight of vinyl propionate.

10. The process as claimed in claim 1, wherein said monomer (a) is a mixture of from 99 to 0.5% by weight of N-vinylpyrrolidone and from 1 to 99.5% by weight of acrylamide, methacrylamide, N-vinylformamide, N-vinyl-N-methylacetamide and/or acrylates.

11. The process as claimed in claim 1, wherein said monomer (b) is divinylethyleneurea, ethylidene bis-3-(N-vinylpyrrolidone), 1-vinyl-3-ethylidenepyrrolidone, allyl acrylate, allyl methacrylate and/or divinylpropyleneurea.

12. The process as claimed in claim 1, wherein said crosslinking agent is present in an amount ranging from 0.4 to 2% by weight.

13. The process as claimed in claim 1, wherein said crosslinking agent is divinylethyleneurea, allyl acrylate, a mixture of divinylethyleneurea and butane diol diacrylate or a mixture of divinylpropyleneurea and methylene-N,N'-biasacrylamide.

14. The process as claimed in claim 1, wherein said heat-transfer medium is water, an alcohol, ketone, ether, aromatic or aliphatic hydrocarbon, halohydrocarbon or ester.

* * * * *